(12) United States Patent
Shaffer et al.

(10) Patent No.: US 7,848,510 B2
(45) Date of Patent: Dec. 7, 2010

(54) METHOD AND SYSTEM FOR RECORDING AUTOMATIC CALL DISTRIBUTOR CALLS

(75) Inventors: Shmuel Shaffer, Palo Alto, CA (US);
Labhesh Patel, San Francisco, CA (US);
Robert T. Bell, Bountiful, UT (US);
Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1537 days.

(21) Appl. No.: 11/187,423

(22) Filed: Jul. 22, 2005

(65) Prior Publication Data

US 2007/0036283 A1   Feb. 15, 2007

(51) Int. Cl.
*H04M 3/02* (2006.01)

(52) U.S. Cl. .............................. 379/266.01; 379/32.05; 379/37; 379/88.21; 379/207.02; 379/265.01; 709/227

(58) Field of Classification Search .................. 370/362, 370/256; 379/67.1, 265.06, 265.11, 265.12, 379/265.02, 265.03, 266.1, 88.17, 168, 189, 379/32.05, 37, 88.21, 112.01, 207.02, 265.01, 379/266.01; 704/1; 707/10; 709/212, 227; 455/415

See application file for complete search history.

(56) References Cited

U.S. PATENT DOCUMENTS

| | | | |
|---|---|---|---|
| 5,089,954 A * | 2/1992 | Rago | 707/10 |
| 5,216,603 A * | 6/1993 | Flores et al. | 704/1 |
| 5,818,908 A * | 10/1998 | Kaplan | 379/88.21 |
| 5,883,945 A * | 3/1999 | Richardson et al. | 379/189 |
| 5,907,611 A * | 5/1999 | Dezonno et al. | 379/266.1 |
| 5,923,746 A * | 7/1999 | Baker et al. | 379/265.02 |
| 6,263,049 B1 | 7/2001 | Kuhn | 379/34 |
| 6,304,635 B1 * | 10/2001 | Iwami et al. | 379/32.05 |
| 6,470,077 B1 | 10/2002 | Chan | 379/88.01 |
| 6,597,783 B1 | 7/2003 | Tada et al. | 379/265.09 |
| 6,665,395 B1 | 12/2003 | Busey et al. | 379/265.09 |
| 6,711,254 B2 * | 3/2004 | Sato et al. | 379/265.02 |
| 6,724,887 B1 * | 4/2004 | Eilbacher et al. | 379/265.03 |
| 6,738,456 B2 * | 5/2004 | Wrona et al. | 379/37 |
| 6,791,975 B1 * | 9/2004 | Aktas et al. | 370/356 |
| 6,870,920 B2 * | 3/2005 | Henits | 379/207.02 |
| 6,904,143 B1 | 6/2005 | Peterson et al. | 379/265.01 |
| 6,970,554 B1 * | 11/2005 | Peterson et al. | 379/266.1 |
| 6,987,841 B1 * | 1/2006 | Byers et al. | 379/88.17 |
| 7,274,685 B1 * | 9/2007 | Peters | 370/352 |
| 7,313,624 B2 * | 12/2007 | Satomi et al. | 709/227 |
| 7,349,535 B2 * | 3/2008 | Shaffer et al. | 379/265.11 |
| 2004/0013250 A1 * | 1/2004 | Kotnur et al. | 379/112.01 |
| 2004/0136503 A1 * | 7/2004 | Kass | 379/67.1 |
| 2005/0129216 A1 * | 6/2005 | Tsujiuchi | 379/265.09 |
| 2006/0062374 A1 * | 3/2006 | Gupta | 379/265.06 |
| 2006/0148459 A1 * | 7/2006 | Wolfman et al. | 455/415 |
| 2006/0256954 A1 * | 11/2006 | Patel et al. | 379/265.12 |
| 2007/0071206 A1 * | 3/2007 | Gainsboro et al. | 379/168 |
| 2007/0136432 A1 * | 6/2007 | Murakami et al. | 709/212 |

* cited by examiner

*Primary Examiner*—Gerald Gauthier
(74) *Attorney, Agent, or Firm*—Baker Botts L.L.P.

(57) ABSTRACT

A method for recording automatic call distributor calls includes receiving from a caller a call for distribution to one of a plurality of agents and distributing the call to a first agent of the plurality of agents for handling. The method includes creating a call signature associated with the call for recording verification and recording communications of the call to a recording file. The method also includes embedding the call signature in the recording file.

26 Claims, 2 Drawing Sheets

METHOD AND SYSTEM FOR RECORDING AUTOMATIC CALL DISTRIBUTOR CALLS

TECHNICAL FIELD OF THE INVENTION

This invention relates in general to communication systems and, more particularly, to a method and system for recording automatic call distributor calls.

BACKGROUND OF THE INVENTION

Automatic call distributors (ACDs) are specialized call center systems designed to match incoming requests for service, for example a telephone call or an e-mail, with a resource that is able to provide that service, for example a human call center agent. ACDs generally perform one or more of the following functions: (i) recognize and answer incoming calls; (ii) review database(s) for instructions on what to do with a particular call; (iii) using these instructions, identify an appropriate agent and queue the call, often times providing a prerecorded message; and (iv) connect the call to an agent as soon as the agent is available.

Call Centers and associated ACDs record some or all conversations between agents and customers. Existing systems either record all conversations or provide agents and/or supervisors with the ability to initiate the recording. The resulting recordings may be used in the process of resolving future disputes regarding the nature of the agreements between agents and callers. The recorded sessions can also be used for coaching and training sessions.

Existing voice recognition software requires high computational complexity and provides mixed results as far as authenticating a caller beyond a reasonable doubt. For example, with all the computational power of the CIA, when a high priority target releases a voice message, the statement from the CIA is typically that the tape was "likely" to be recorded by the target. In addition, voice recording does not ensure that the recording provides a complete account of what had transpired without any edits.

Voice recognition and user verification systems for call centers are based on sophisticated digital signal processing algorithms. Digital signatures are used for authentication and non-repudiation of digital documentations. Steganography is a technique that takes one piece of information and hides it within another. Digital media (images, sounds recordings, even disks) often contains unused or insignificant areas of data. Steganography takes advantage of these areas, replacing them with information. The media can then be exchanged without anyone knowing what actually lies inside. Steganography can also be used to place a hidden trademark in images, music and software, a technique referred to as watermarking. There are many audio watermarking techniques available that use the principles of psychoacoustic masking to inaudibly embed a hidden data set within known data. The hidden data can be recovered from the embedded data by using a decoder algorithm.

SUMMARY OF THE INVENTION

The present invention provides a method and system for recording automatic call distributor calls that substantially eliminates or reduces at least some of the disadvantages and problems associated with previous methods and systems.

In accordance with a particular embodiment, a method for recording automatic call distributor calls includes receiving from a caller a call for distribution to one of a plurality of agents and distributing the call to a first agent of the plurality of agents for handling. The method includes creating a call signature associated with the call for recording verification and recording communications of the call to a recording file. The method also includes embedding the call signature in the recording file.

Embedding the call signature in the recording file may comprise steganographically embedding the call signature in the recording file. The call signature may be embedded in the recording file while recording the communications of the call to the recording file. Creating a call signature associated with the call may comprise creating a call file comprising information associated with the call, calculating a hash of the call file and encrypting the hash of the call file as the call signature. The information associated with the call may comprise a call timestamp, an identification of the first agent and/or a certificate of a recording server used to record the call communications. Encrypting the hash of the call file may comprise encrypting the hash of the call file using a private key associated with a recording server used to record communications of the call.

In accordance with another embodiment, a system for recording automatic call distributor calls includes an interface operable to receive from a caller a call for distribution to one of a plurality of agents and a processor coupled to the interface and operable to distribute the call to a first agent of the plurality of agents for handling. The processor is also operable to create a call signature associated with the call for recording verification, record communications of the call to a recording file and embed the call signature in the recording file.

Technical advantages of particular embodiments include the embedding of a call signature into a recording file of a call to an automated call distributor. Thus, a cryptographically sound means of ensuring the authenticity and completeness of a recorded call session in a call center environment is provided. For increased security, a hash function may be used in formulating the call signature, and the call signature may be steganographically embedded in the call recording file, such as while the call is being recorded.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
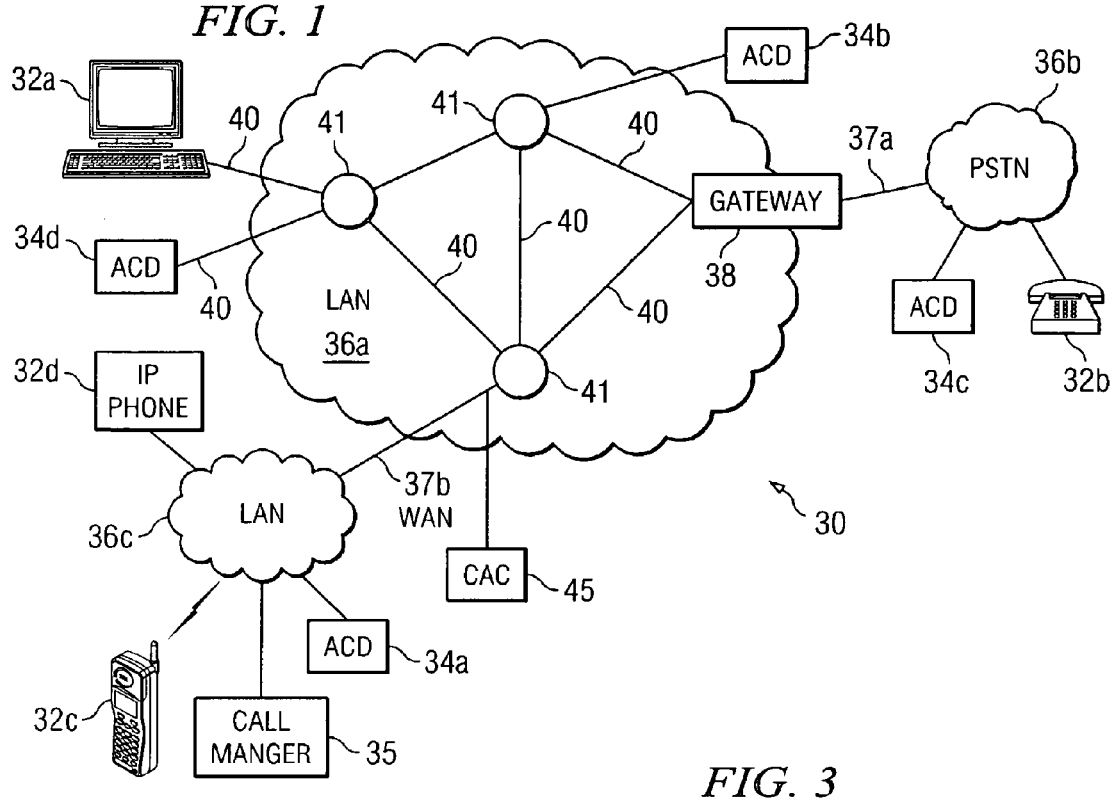
FIG. 1 illustrates a communication system including a plurality of endpoints operable to communicate among each other and a plurality of automatic call distributors, in accordance with a particular embodiment of the present invention.

FIG. 1 illustrates a communication system 30 including a plurality of endpoints 32*a*-32*d* having the ability to establish communication sessions between each other and/or automatic call distributors (ACDs) 34*a*-34*d*, using one or more of communication networks 36a-36c. ACDs 34a-34d are specialized communication systems designed to route incoming calls to available agents, so that calls are properly and/or evenly distributed. For the purposes of this specification, "automatic call distributor" or "ACD" shall refer to any combination of hardware, software and/or embedded logic which is operable to automatically distribute incoming calls, and "calls" shall include requests for service transmitted using any audio and/or video means, including signals, data or messages transmitted through voice devices, text chat, web sessions, facsimile, instant messaging and e-mail. ACDs 34a-34d may include call centers that receive incoming customer calls for distribution to agents and that place calls from agents to customers.

In particular embodiments, ACDs 34a-34d provide a mechanism for authenticating a recording of a conversation with an authenticated user. A call signature may be embedded into a recording file of a call to an ACD. Thus, a cryptographically sound means of ensuring the authenticity and completeness of a recorded call session in a call center environment is provided. For increased security, a hash function may be used in formulating the call signature, and the call signature may be steganographically embedded in the call recording file, such as while the call is being recorded. Additional embodiments and functionality are further discussed below.

Call manager 35 includes any combination of hardware, software and/or encoded logic that operates to receive and process calls to facilitate communication among agents and other users of system 30. In particular embodiments, call manager 35 may act as a private branch exchange (PBX) by supporting Internet Protocol (IP) PBX functions, such as hold, park, transfer, redirect and/or other high level and low level call management features. For the processing of calls, call manager 35 maintains information on the agents and other users of system 30. For example, call manager 35 may maintain a listing, table, or other organization of information about agents of system 30. The information may include a name or other identifier for each agent. The information may also include contact information such as phone numbers and email addresses for the agents. When a call is received by call manager 35, call manager 35 and an ACD, such as ACD 34a, cooperate to receive, process and distribute the call. For example, call manager 35 and/or ACD 34a may identify one or more agents that are available to receive the call.

In the illustrated embodiment, communication network 36a is a local area network (LAN) that enables communication between a plurality of endpoints 32a-32d and ACDs 34a-34d distributed across multiple cities and geographic regions. In another embodiment, a single, central ACD may be used, which distributes incoming calls to agents distributed across multiple cities and geographic regions. Communication network 36b is a public switched telephone network (PSTN) and couples endpoint 32b and ACD 34c with communication network 36a through gateway 38. Communication network 36c is another LAN, which couples endpoints 32c and 32d, ACD 34a and call manager 35 with communication network 36a. Accordingly, users of endpoints 32a-32d and ACDs 34a-34d can establish communication sessions between and among each network component coupled for communication with one or more of networks 36a-36c. Communication links 37a and 37b couple communication networks 36a and 36b and communication networks 36a and 36c, respectively. In the illustrated embodiment, communication link 37b is a wide area network (WAN), which couples LANs 36a and 36c. A call admission control (CAC) system 45 may be used to monitor and manage the amount of bandwidth available over WAN 37b.

Communication network 36a includes a plurality of segments 40 and nodes 41 that couple endpoint 32a with ACDs 34b and 34d, gateway 38 and communication networks 36b-36c. Therefore, a user of endpoint 32a is provided with access to endpoints 32b-32d and ACDs 34a-34d. Nodes 41 may include any combination of network components, gatekeepers, call managers, telephony servers, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d and/or ACDs 34a-34d.

In a particular embodiment, communication network 36a employs voice communication protocols that allow for the addressing or identification of endpoints, nodes and/or ACDs coupled to communication network 36a. For example, using IP, each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, at least endpoint 32d, ACDs 34a-34b, call manager 35 and gateway 38 are IP telephony devices. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held personal digital assistants (PDAs), or any other device capable of performing telephony functions over an IP network.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32d, ACDs 34a-34d, call manager 35 and/or gateway 38 may be any combination of hardware, software and/or encoded logic that provides communication services to a user. For example, endpoints 32a-32d may include a telephone, a computer running telephony software, a video monitor, a camera, an IP phone, a cell phone or any other communication hardware, software and/or encoded logic that supports the communication of packets of media (or frames) using communication network 36a. Endpoints 32a-32d may also include unattended or automated systems, gateways, other intermediate components, or other devices that can establish media sessions. Although FIG. 1 illustrates a particular number and configuration of endpoints, ACDs, segments, nodes, call managers and gateways, communication system 30 contemplates any number or arrangement of such components for communicating media.

Figure 2:
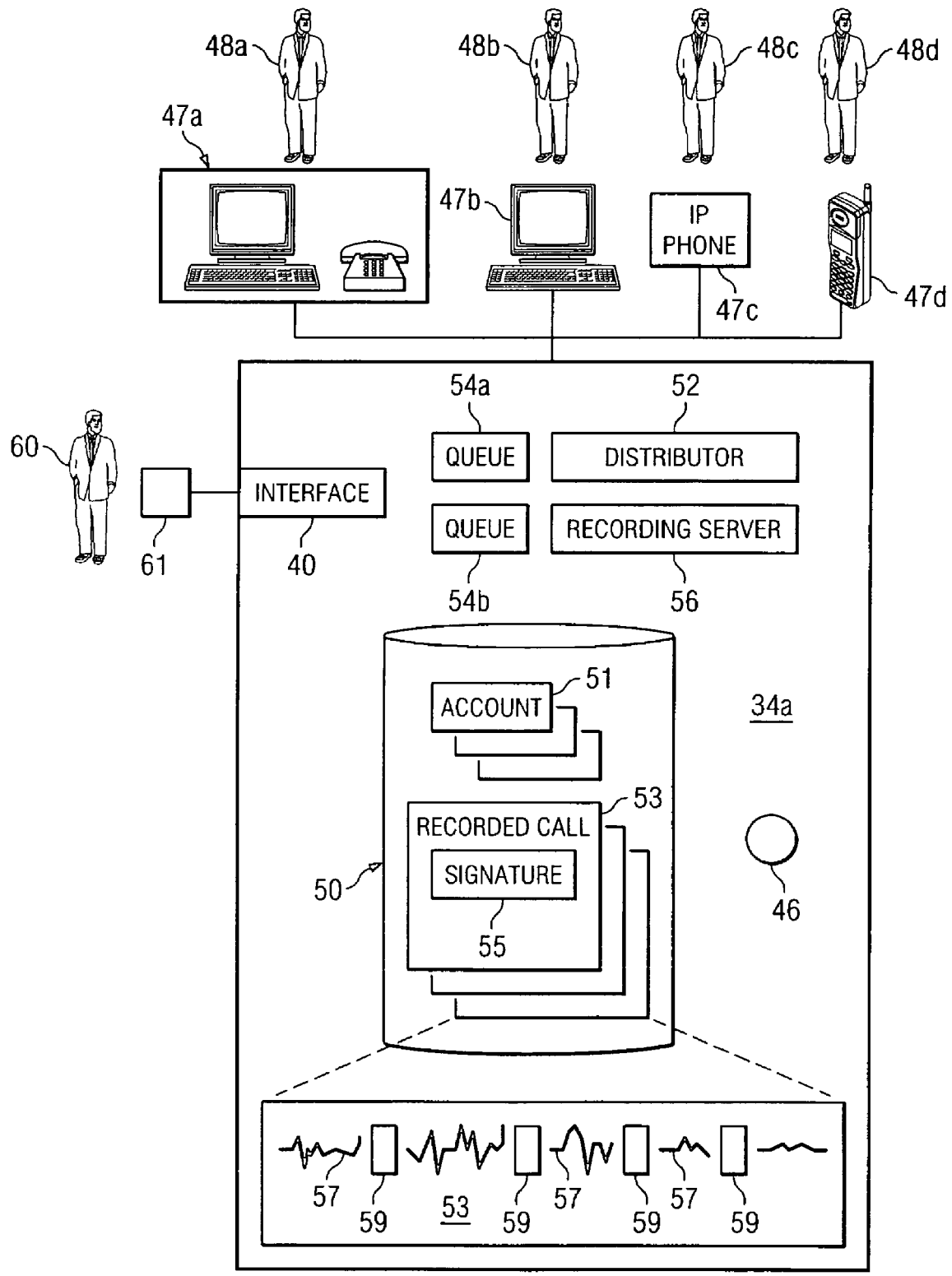
FIG. 2 illustrates an automatic call distributor of FIG. 1 in more detail, illustrating aspects of the present invention.

FIG. 2 illustrates ACD 34a in more detail, in accordance with a particular embodiment. ACD 34a includes an interface or input ports 40 which couple ACD 34a with other components of communication system 30. ACD 34a also includes a processor 46, memory module 50, distributor 52, queues 54a and 54b and recording server 56.

When a call is received for processing by ACD 34a, a processor 46 may be used to determine which of a plurality of agents 48a-48d should receive the call using their associated endpoints 47a-47d, respectively. The identification of the available agent may be made by considering presence information relating to the availability of agents 48a-48d with respect to ACD 34a and communication system 30. Additionally or alternatively, the identification of the available agent may be made by considering agent information maintained by ACD 34a and/or call manager 35 of communication system 30. Agents 48a-48d may interact with ACD 34a through their endpoints 47, such as desktops, IP phones, mobile phones or other devices.

Processor 46 may be a microprocessor, controller, or any other suitable computing device or resource. Processor 46 works, either alone or with other components of ACD 34a, to provide the functionality of ACD 34a described herein. Memory module 50 may be any form of volatile or non-volatile memory including, without limitation, magnetic media, optical media, random access memory (RAM), read-only memory (ROM), removable media, hard drives, disks or any other suitable local or remote memory component. In the illustrated embodiment, memory module 50 includes accounts 51 which may comprise any suitable information relating to user accounts, such as authentication information, customer history and other records. Memory module 50 also includes recorded calls 53 which include recorded communications between callers and agents as well as call signatures 55 as further discussed below. Some embodiments may include more than memory module for particular operational needs or may include one or more memory modules distributed through communication system 30.

If a suitable agent is available to receive the incoming call, a distributor 52 of ACD 34a, working with processor 46, distributes the call to such agent for handling. Such handling may comprise, for example, connecting a caller of the call with the suitable agent if the call comprises a voice call or forwarding the call to the suitable agent if the call comprises, for example, an e-mail. If a suitable agent is not available, the call may be placed into a queue 54 in order to wait for an appropriate agent(s). In this embodiment, ACD 34a has two queues 54; however other embodiments of the present invention may have none, one or more than two queues 54. The selection of which queue 54 to place an incoming call may depend on the type of customer making the call, the type of service requested in the call or any other characteristic or condition relating to the call or ACD 34a. While a customer is waiting for an agent, ACD 34a may perform one or more of several functions including data collection from the user, playing of pre-recorded messages or other automated process. As soon as a suitable agent becomes available, distributor 52 may distribute the call to the appropriate agent. Distributor 52 may comprise any suitable software, hardware or encoded logic and may provide its functionality through processor 46.

Recording server 56 records calls between agents 48 and callers of ACD 34a, such as caller 60, and generates call recordings for storage. Recording server 56 may represent any suitable combination of hardware, software and/or encoded logic located within ACD 34a or distributed throughout communication network 30. In particular embodiments, recording server 56 and distributor 52 represent, at least in part, software applications running on processor 46.

As indicated above, particular embodiments utilize the authentication of a caller that takes place as the caller enters their password as part of their call into an ACD. As part of the call recording process, the ACD embeds a session specific signature into the voice file. In some embodiments, during the process of creating a user account, such as an account 51 for user 60, ACD 34a creates an identifying string that is associated with the user account. This string may become the permanent identity for the user even if other information associated with the user account, such as PINs and/or passwords change, and may be stored in account 51.

In a particular embodiment, when user 60 calls ACD 34a using endpoint 61, the user enters their account identity, such as their account number, together with their PIN and/or password or other account information, such as the identification string discussed above. This information is used to authenticate the user and to retrieve the user-specific identity string from memory module 50. Other embodiments may include other authentication information, such as biometric information. In some cases, the user may be authenticated through a presence system and/or through voice recognition. Other data such as date and time, agent ID, trunk ID, Caller ID (if available) and/or any other identifying information desired is aggregated, either together or without the specific user-authentication information discussed above, into a call data block associated with the call. This information may be later used to verify the authenticity of a recording of the call. Using non-user entered information such as an identification string created by the ACD enables the system to maintain its integrity even through changes in the user's password or without receipt of the user's password.

The call is recorded by recording server 56 and is placed into memory module 50 as a recorded call 53. The recording is processed by setting all of the bits in the file that will be used to steganographically record the authentication data to zero, appending the X.509 certificate of recording server 56 to the end of the file and calculating a cryptographically strong hash of the resultant file. That hash is concatenated with the aggregated data block and encrypted using the private key associated with the X.509 certificate of recording server 56. The resulting encrypted data block, an encrypted call signature 55 or voice digital signature, is inserted into recorded call 53 in the previously zeroed bits. Thus, the digital signature, containing any data used to confirm the identity of a user (e.g., authentication data such as passwords, biometrics or any other suitable data), is inserted or embedded in the recording file. This set of actions creates a voice recording file that cannot be altered without detection. The file may be stored in memory module 50 as illustrated.

In some embodiments, the zeroing of the bits that will receive the steganographically hidden signature and the calculation of the signature hash are performed as the media stream is received, in some cases continuously for the duration of the conversation. Thus, the window of opportunity for a hacker to modify the contents of the discussion may be closed. In other embodiments, the data for the call signature may be temporarily stored while the call is in progress and may be embedded in the recorded call once the call is complete.

Recorded call 53 is illustrated as including media portions 57 which comprise communications of the actual call, for example, between caller 60 and an agent 48. In addition, recorded call 53 includes embedded signature portions 59 which together form encrypted call signature 53.

In particular embodiments, the digital signature may be calculated progressively over the call media stream. For example, the aggregated data block may be assembled over partial summations of the received media as there are sufficient positions within the received media to accept the contents of the aggregated data block. Once the block is written to the recorded call 53, the hash value continues from where it was and the next segment of the media stream is also hashed, and the process is repeated. To protect against deletion of the terminal portion of the voice recording, the last block may be identified uniquely as the last block. Thus, the aggregated data block used for this mode of verification may include a "last block indicator" set to one state (e.g., zero) for all except the last block and set to the opposite state (e.g., one) for the last block.

In some embodiments, the voice digital or call signature may not be steganographically hidden within the file but may be appended to the end of the file without the post recording step of zeroing bits within the recording. The file may then be written to archival media, such as memory module 50. In yet another embodiment, the voice digital signature may be stored in a separate file, and the linkage to the recorded call file may be established within the voice digital signature file. The files may then be written to archival media.

In some embodiments, the aggregated call data block may be appended to the end of the call media file and may be included in the field of the hash calculation. In this case, only the hash is encrypted with the private key of the recording server associated with its X.509 certificate. Although X.509 certificates are discussed herein, particular embodiments may utilize any particular mechanism whereby a public key and an identity of the recording server are bound together.

Verification of the voice digital or call signature is a matter of retrieving the voice digital signature block from wherever it is stored (e.g., call signature 55 stored within recorded call 53) and decrypting the block. Next, the hash value is retrieved, and the hash is recalculated over the original media (or the modified media if the voice digital signature is embedded steganographically, zeroing the bits before calculating the hash) and compared to the hash recovered from the call signature 55. If the hashes match, then the file is unaltered and the aggregated call signature block can be relied upon to authoritatively determine the veracity of the media file and its associated identity information. It should be understood that some embodiments may not include hash calculations for secure call signature storage. Such embodiments may include any other suitable method according to operational and configuration needs.

It will be recognized by those of ordinary skill in the art that ACD 34a may include any number of processors, distributors, recording servers, memory modules or other components to accomplish the functionality and features described herein. The processor 46, memory module 50, queues 54, distributor 52 and/or recording server 56 associated with ACD 34a may be centrally located (local) with respect to one another, or distributed throughout communication system 30.

Figure 3:
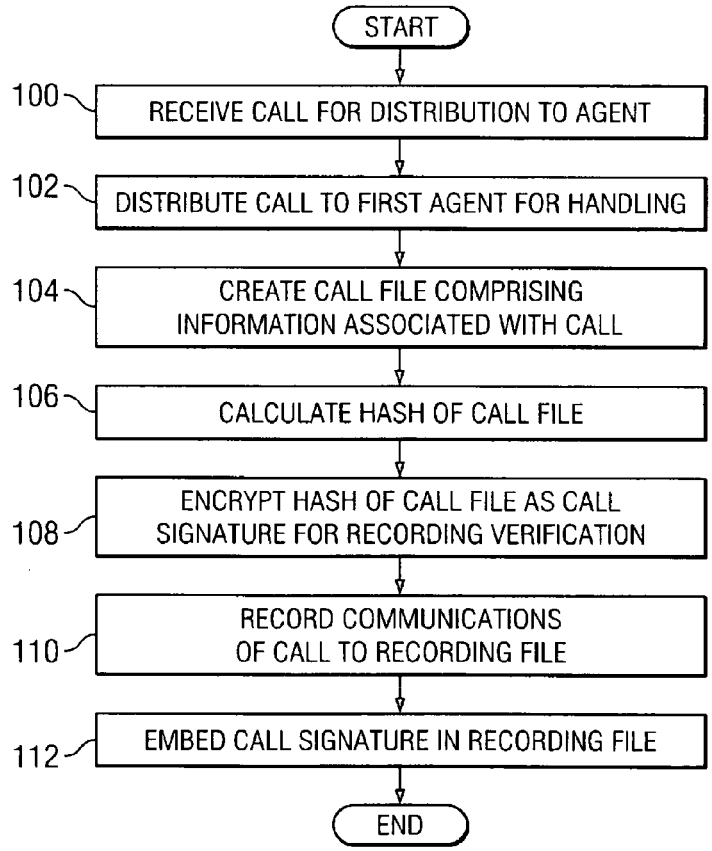
FIG. 3 illustrates a method for recording automatic call distributor calls, in accordance with an embodiment of the present invention.

FIG. 3 is a flowchart illustrating a method for recording automatic call distributor calls at an automatic call distributor, in accordance with a particular embodiment. The method begins at step 100 where a call is received for distribution to an agent of a plurality of agents. At step 102, the call is distributed to a first agent for handling, such as by a processor and/or distributor.

At step 104, a call file is created comprising information associated with the call. The call file may comprise information that would be helpful in a digital signature to verify the veracity of a recording of the call, such as user information (e.g., user authentication information or user identification information created and stored by an ACD), date and time stamp of the call, ACD resources used by the call (e.g., port/trunk identification), length of the call, identification of agent(s) who took the call, caller ID information, information related to the recording server used to record the call, etc. At step 106 a hash of the call file is calculated using any suitable hash function. At step 108, the hash of the call file is encrypted as a call signature for subsequent recording verification.

At step 110, communication of the call are recorded to a recording file, such as by a processor and/or recording server. In some cases, all communications on the call may be recorded while in other cases only particular communications may be recorded (e.g., communications from the caller or communications from one or more agents). At step 112, the call signature is embedded in the recording file. In some embodiments, the call signature may be embedded steganographically throughout the recording file. In some cases such embedding may occur while the call is being recorded. If portions of the call signature are not embedded to the end of the recording file, a last block indicator may be implemented to identify the end of the recording.

Some of the steps illustrated in FIG. 3 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and automatic contact distributor 34*a*, these elements may be combined, rearranged or positioned in order to accommodate particular routing architectures or needs. In addition, any of these elements may be provided as separate external components to communication system 30, automatic contact distributor 34*a* or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A computer-implemented method for recording automatic call distributor calls executable on a processor, comprising:
   receiving from a caller a call for distribution to one of a plurality of agents;
   distributing the call to a first agent of the plurality of agents for handling;
   creating a call signature associated with the call for recording verification;
   recording communications of the call to a recording file; and
   embedding the call signature in the recording file.

2. The method of claim 1, wherein embedding the call signature in the recording file comprises steganographically embedding the call signature in the recording file.

3. The method of claim 1, wherein the call signature is embedded in the recording file while recording the communications of the call to the recording file.

4. The method of claim 3:
   wherein the recording file includes a portion of recorded call communications following the end of the embedded call signature; and
   further comprising providing in the recording file an indicator to indicate the termination of the recorded call communications.

5. The method of claim 1, wherein creating a call signature associated with the call, comprises:
   creating a call file comprising information associated with the call;
   calculating a hash of the call file; and
   encrypting the hash of the call file as the call signature.

6. The method of claim 5, wherein the information associated with the call comprises at least a call timestamp and an identification of the first agent.

7. The method of claim 5, wherein the information associated with the call comprises a certificate of a recording server used to record the call communications.

8. The method of claim 5, wherein encrypting the hash of the call file comprises encrypting the hash of the call file using a private key associated with a recording server used to record communications of the call.

9. The method of claim 1:
   further comprising receiving authentication information from the caller; and
   wherein creating a call signature associated with the call comprises creating a call signature using the authentication information.

10. A system for recording automatic call distributor calls, comprising:
    an interface operable to receive from a caller a call for distribution to one of a plurality of agents; and
    a processor coupled to the interface and operable to:
      distribute the call to a first agent of the plurality of agents for handling;
      create a call signature associated with the call for recording verification;
      record communications of the call to a recording file; and
      embed the call signature in the recording file.

11. The system of claim 10, wherein a processor operable to embed the call signature in the recording file comprises a processor operable to steganographically embed the call signature in the recording file.

12. The system of claim 10, wherein the processor is operable to embed the call signature in the recording file while recording the communications of the call to the recording file.

13. The system of claim 12, wherein:
    the recording file includes a portion of recorded call communications following the end of the embedded call signature; and
    the processor is further operable to provide in the recording file an indicator to indicate the termination of the recorded call communications.

14. The system of claim 10, wherein a processor operable to create a call signature associated with the call, comprises a processor operable to:
    create a call file comprising information associated with the call;
    calculate a hash of the call file; and
    encrypt the hash of the call file as the call signature.

15. The system of claim 14, wherein the information associated with the call comprises at least a call timestamp and an identification of the first agent.

16. The system of claim 14, wherein the information associated with the call comprises a certificate of a recording server used to record the call communications.

17. The system of claim 14, wherein a processor operable to encrypt the hash of the call file comprises a processor operable to encrypt the hash of the call file using a private key associated with a recording server used to record communications of the call.

18. The system of claim 10, wherein:
    the interface is further operable to receive authentication information from the caller; and
    a processor operable to create a call signature associated with the call comprises a processor operable to create a call signature using the authentication information.

19. A system for recording automatic call distributor calls, comprising:
    means for receiving from a caller a call for distribution to one of a plurality of agents;
    means for distributing the call to a first agent of the plurality of agents for handling;
    means for creating a call signature associated with the call for recording verification;
    means for recording communications of the call to a recording file; and
    means for embedding the call signature in the recording file.

20. The system of claim 19, wherein embedding the call signature in the recording file comprises steganographically embedding the call signature in the recording file.

21. The system of claim 19, wherein the call signature is embedded in the recording file while recording the communications of the call to the recording file.

22. The system of claim 19, wherein means for creating a call signature associated with the call, comprises:
    means for creating a call file comprising information associated with the call;

means for calculating a hash of the call file; and means for encrypting the hash of the call file as the call signature.

23. Logic embodied in a computer readable medium, the computer readable medium comprising code that, when executed by a processor, is operable to:

receive from a caller a call for distribution to one of a plurality of agents;

distribute the call to a first agent of the plurality of agents for handling;

create a call signature associated with the call for recording verification;

record communications of the call to a recording file; and embed the call signature in the recording file.

24. The medium of claim 23, wherein code operable to embed the call signature in the recording file comprises code operable to steganographically embed the call signature in the recording file.

25. The medium of claim 23, wherein the code is operable to embed in the recording file while recording the communications of the call to the recording file.

26. The medium of claim 23, wherein code operable to create a call signature associated with the call, comprises code operable to:

create a call file comprising information associated with the call;

calculate a hash of the call file; and encrypt the hash of the call file as the call signature.

* * * * *